(12) United States Patent
Chen et al.

(10) Patent No.: US 8,162,640 B2
(45) Date of Patent: Apr. 24, 2012

(54) MOLD HEATING/COOLING STRUCTURE

(75) Inventors: Shia-Chung Chen, Taoyuan County (TW); Jen-An Chang, Taoyuan County (TW)

(73) Assignee: Chung Yuan Christian University, Taoyuan County (TW)

( * ) Notice: Subject to any disclaimer, the term of this patent is extended or adjusted under 35 U.S.C. 154(b) by 122 days.

(21) Appl. No.: 12/713,303

(22) Filed: Feb. 26, 2010

(65) Prior Publication Data
US 2010/0221373 A1    Sep. 2, 2010

(30) Foreign Application Priority Data
Feb. 27, 2009   (TW) ................................ 98106286 A

(51) Int. Cl.
  *B29C 45/73*    (2006.01)
(52) U.S. Cl. .......... 425/3; 425/174.6; 425/548; 425/552
(58) Field of Classification Search ........... 425/3, 174.6, 425/547, 548, 552
See application file for complete search history.

(56) References Cited

U.S. PATENT DOCUMENTS

| | | | | |
|---|---|---|---|---|
| 5,662,943 | A | * | 9/1997 | Yamashita et al. ............... 425/3 |
| 7,367,791 | B2 | * | 5/2008 | Murata et al. ..................... 425/3 |
| 2010/0219928 | A1 | * | 9/2010 | Alakula ........................... 425/78 |

FOREIGN PATENT DOCUMENTS

| | | |
|---|---|---|
| TW | I228945 | 3/2005 |
| TW | I279304 | 4/2007 |
| TW | M317917 | 9/2007 |

* cited by examiner

*Primary Examiner* — Timothy Heitbrink
(74) *Attorney, Agent, or Firm* — WPAT., P.C.; Justin King

(57) ABSTRACT

A mold heating/cooling structure for a mold configured with a die base and an insert, comprising: a heat insulating layer, disposed surrounding a die impression of the die base for insulating the heat conduction between the die base and the insert; a magnetic powder layer, disposed against the heat insulating layer; a coil, being disposed on the magnetic powder layer in a manner that it is circling from the outside in toward the center of the magnetic powder layer; and a cooling plate, configured with a plurality of second fluid channels provided fro a fluid to flow therein. With the aforesaid structure, the insert can be heated directly by the coil the it is subject to a high-frequency current, and the heated coil as well as the insert can be cool down with high efficiency as soon as the fluid is fed into the second fluid channels.

17 Claims, 8 Drawing Sheets

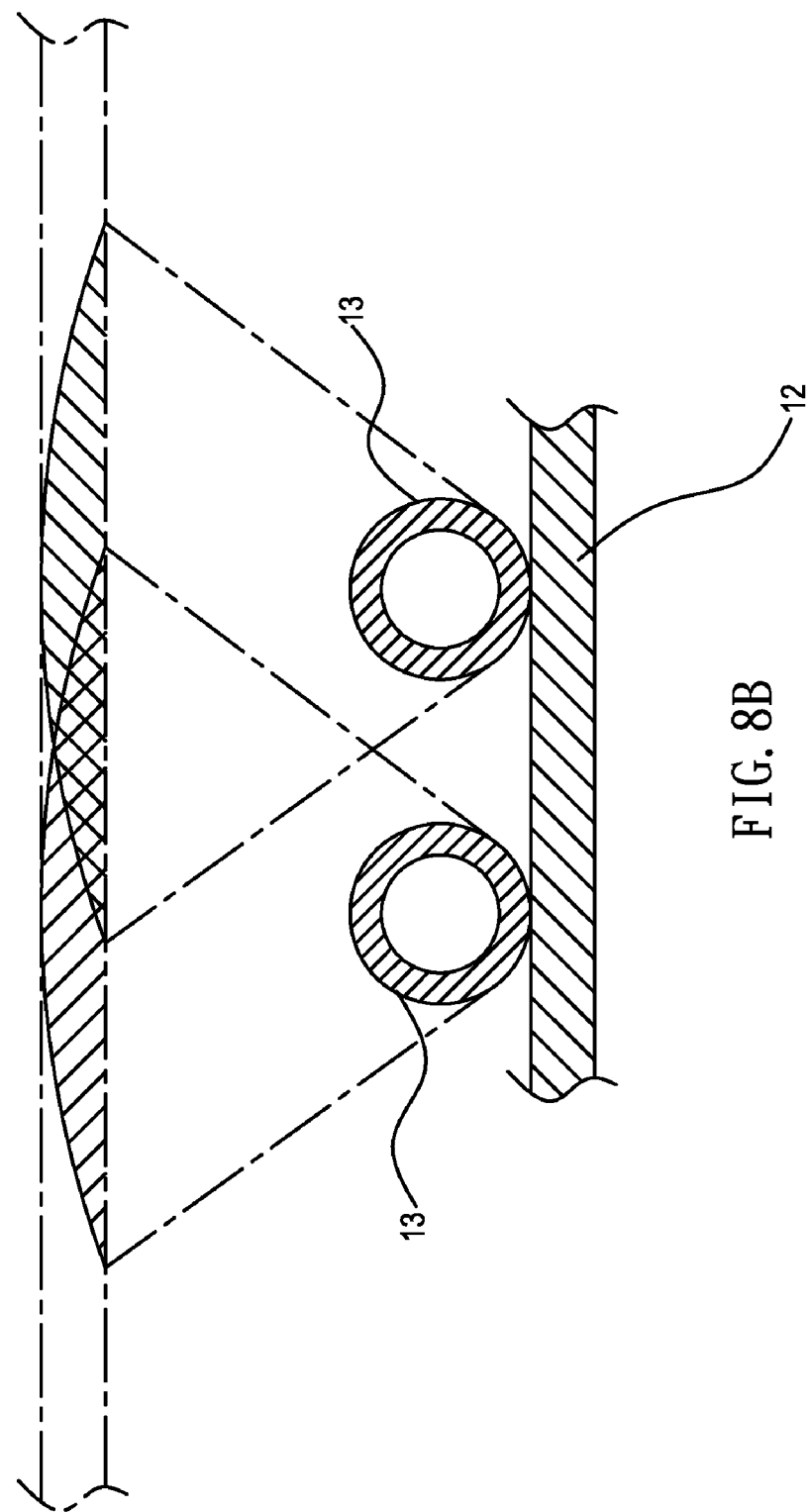

MOLD HEATING/COOLING STRUCTURE

FIELD OF THE INVENTION

The present invention relates to a mold heating/cooling structure, and more particularly, to a mold structure capable of acting as a heating device for generating an evenly distributed magnetic field to be used for heating an insert in a mold evenly and with high heating efficiency as it is insulated so as to concentrate the heat generated thereby on the insert; and also capable of acting as a cooling device for rapidly dissipating the heat of the inert and thus cooling down the insert with high cooling efficiency.

BACKGROUND OF THE INVENTION

With rapid advance of manufacturing technology, there are many methods being developed for molding plastics into required products, such as injection molding, blow molding, hot embossing molding, compression molding, draw molding, and so on. Among which, injection molding is the most common method of plastic part manufacturing which is used to create a large variety of products with different shapes and sizes, ranged from as simple as a cup to a very complex automotive dashboard, and also ranged from as small as a watch gear weighted only 0.01 gram to a very large bathing tub weighted more than 20 kilograms. Most importantly, they can create products with complex geometry that many other processes cannot, since it is advantageous in its ability of making complex plastic parts at high production rates and high tolerances of repeatability with high precision in dimension. Moreover, the most common material used in injection molding includes polyethylene (PE), polypropene (PP), polyvinylidene chloride (PVC), polystyrene (PS), poly(acrylonitrile butadiene styrene) (ABS), and so on.

In a plastic injection molding process, a plastic material is fed into a heated barrel, melted, mixed, and forced into a mold cavity where it cools and hardens to the configuration of the mold cavity. Generally, the mold is only heated to a temperature that is lower than the glass transition point of the plastic material which is to be molded therein, so that the melted plastic is able to solidify to the configuration of the mold cavity and thus form a solid layer on the cavity surface as soon as it come into contact with the cavity surface. It is noted that the ratio between the thickness of the solid layer and that of a final product of the injection molding process is increasing with the decreasing of the final product's thickness. However, if the ratio is too larger, i.e. the solid layer is too thick comparing with that of the final product, it will cause difficulty for feeding the melted plastic into the mold and thus plastic injection molding process will have to deal with problems, such as short shot, incomplete molding, and residual stress, etc.

Except for the injection unit, control unit and hydraulic unit, an injection molding device uses a clamping unit for molding the melted plastic into final products. The clamping unit usually is comprises of a pair of matching first clamping seat and second clamping seat, which can also be referred as a front molding board and a rear molding board. As the male die and female die are arranged respectively on the first clamping seat and the second clamping seat, the male die and the female die can be integrated tightly by the clamping of the first and the second clamping seats so that the operation of plastic filling and cooling process for injection molding can be proceeded.

In the aforesaid conventional injection molding process, a thin solid layer will be formed on the cavity wall as soon as the melted plastic being filled into the cavity is in contact with the cooler cavity wall, and the same time that the temperature of the melted plastic in the cavity that is flowing in the neighborhood of the cavity wall will drop. Accordingly, the closer to the center of the cavity, the faster the melted plastic is going to flow as it is almost static near the cavity wall. It is noted that such inconsistent flowing condition for the melted plastic flowing inside the cavity will cause turbulences to be generated in the cavities of the male die and the female die even when the structures of the two are only a slightly more complex, and consequently, there can be ripples and lines being formed on its final products. The ripples and lines along with bubbles caused by the air trapped inside the cavities are going to cause severe defect to the outlook of the final products.

In response to the smaller, thinner and lighter trend for the modern 3C products, a more advanced plastic injection molding process is in demand for satisfying the requirement of producing products configured with microstructures measured in hundreds of micrometers or even tens of micrometers, such as backlight panels, fiber optic connecters, etc., that can not be manufactured by conventional plastic injection molding as it is troubled by the molding conditions of flowability and plastic solidification while being used for manufacturing the aforesaid products configured with microstructures. For overcoming such difficulties, there are many studies relating to how to raise the cavity temperature in a mold rapidly, and some of which even come up with a cooling method along with the rapid heating method so as to reduce the time of an injection molding cycle. The aforesaid rapid heating methods currently available can be categorized into three types according to the heating means, which are steam heating type, electrical resistance heating type and high-frequency heating type. For clarity, several electrical resistance heating devices and high-frequency heating devices will be provided hereinafter for illustration.

There is a mold heating/cooling device being disclosed in TW Pat. No. M317917. Using the aforesaid device, when the first and the second clamping seats are clamped for integrating a first die and a second die of a mold and as soon as a melted plastic is being fed into the cavities of the mold, the heater of the device will be powered to heat up while enabling the heat of the heater to be transferred through the second die to the melted plastic inside the cavity, by that the melted plastic is able to flow at the same speed inside the cavity without causing any turbulence. Therefore, the aforesaid device is able to eliminate the formation of ripples, lines and bubbles on the products of injection molding. However, although the aforesaid device is able to raise the temperature of the mold rapidly, its heating efficiency can be very low since the heat from the heater can be dissipated by the mold and lost before being conducted thereby to the melted plastic. Moreover, since the temperature of a location in the mold that is closer to the heater will be higher than that farther to the heater, the melted plastic at different position in the mold might still flow at different speeds.

In a method and apparatus for heating mold by high-frequency induced current disclosed in TW Pat. No. I279304, there are holes near the heated surface in the mold and the coils can be installed into the holes. The coils surround the heated surface and are conducted with high frequency current. Due to the directional change of the current, the blocks that are surrounded by the coils will be heated by the hysteresis losses and the eddy-current losses. The surface of the mold insert or cavity will be heated rapidly. There are cooling holes set near the heated surface or beside the coil-pipe. The cooling liquid or air can flow in the holes to carry out extra energy and the temperature of the mold will be decreased. The position of the cooling holes, the flow speed and temperature deviation of the liquid and air will influence the temperature of the mold. However, to use the magnetic field heating properly it is importance to control the distance between any two neighboring coils. It is noted that when the neighboring coils are positioned too close to each other for enabling the coils to generate heat in a uniform manner, the interaction between the magnetic fields caused by the currents flowing in the neighboring coils will cause the heating efficiency of the heating device to drop. Nevertheless, when the distance between neighboring coils is increased for improving heating efficiency, the melted plastic in the mold may be heated not evenly and thus might be flowing at different speeds In a method and device to increase distribution uniformity of magnetic force disclosed in TW Pat. No. I 228945, the coil body is coiled in such a way that it appears to have undulating and even distributed multi-layer structure. As there is a pluralities of neighboring coils formed on different layers of the coil body, magnetism goes through any two neighboring coils will not repel or counteract each other because the neighboring coils are not on the same plane. Thus the aforesaid device can improve the uniformity of its high cycle wave magnetic field distribution. However, since coil body is coiled as an undulating and even distributed multi-layer structure provided for different coils to be disposed thereof at different layers, it will require the aforesaid device to be designed with a larger space for accommodating the coil body so that the overall size of the device will be increased and thus the heating distance is increased in the consequence of unable to shorten the heating cycle.

Therefore, the focal point of the present invention is how to heat up a mold or inserts evenly in relatively shorter period of time and cool down the same thereafter as well.

SUMMARY OF THE INVENTION

In view of the disadvantages of prior art, the primary object of the present invention is to provide a mold heating/cooling structure for a mold capable of using a magnetic powder layer for enabling a magnetic filed generated from a coil conducted with current to be distributed evenly so as to heat the inserts of the mold evenly.

Another object of the invention is to provide a mold heating/cooling structure for a mold capable of improving the cooling efficiency to the inserts of the mold by arranging a cooling plate or cooling layer to contact directly with the inserts.

Yet, another object of the invention is to provide a mold heating/cooling structure for a mold capable of enabling heat to be concentrated without being conducted to its die base by the use of a heat insulating layer, and thus capable of heating the mold with improved heating efficiency.

Furthermore, another object of the invention is to provide a mold heating/cooling structure for a mold capable of supporting large-sized inserts by at least one supporting column for preventing the same from deforming by their own weights, and the same time that as the supporting columns being made of the same material as the inserts are positioned to contact with the inserts directly, they can conduct heat rapidly to the inserts or can cause heat to be dissipated from the inserts by the heat conduction therethrough. Thereby, both heating efficiency and cooling efficiency are improved.

It is further yet another object of the invention to provide a mold heating/cooling structure for a mold capable of operating with higher heating efficiency and cooling efficiency as each layer in its structure is formed comparatively thinner so that the overall thickness and size of the mold heating/cooling structure are smaller.

To achieve the above objects, the present invention provides a mold heating/cooling structure for a mold configured with a die base and an insert, being disposed at a position between the die base and the insert while the die base is formed with a die impression for receiving the insert therein and the insert is formed with a cavity, the mold heating/cooling structure comprising: a heat insulating layer, disposed surrounding the periphery of the die impression as well as the bottom thereof for insulating the heat conduction between the die base and the insert; a magnetic powder layer, disposed against the heat insulating layer; a coil, formed with a current-input port and a current-output port, being disposed on the magnetic powder layer in a manner that it is circling from the outside in toward the center of the magnetic powder layer; and a cooling plate, configured with a plurality of second fluid channels provided for a fluid to flow therein, being disposed against the magnetic powder layer while enabling the same to contact directly with the insert.

In an exemplary embodiment of the invention, the mold heating/cooling structure for a mold further comprises: a supporting column, sandwiched between the insert and the heat insulating layer at a position relating to the center of the coil and being made of a material the same as that of the insert.

In another exemplary embodiment of the invention, the coil is a hollow copper tube wrapped by an insulating material that is configured with a first fluid channel provided for the fluid to flow therein.

In another exemplary embodiment of the invention, the coil is disposed at a position between the heat insulating layer and the magnetic powder layer.

In another exemplary embodiment of the invention, the coil is disposed at a position between the magnetic powder layer and the cooling plate.

With the structures illustrated in the aforesaid embodiments, when a high-frequency current is loaded to the coil for causing a magnetic field to be generated, the generated magnetic field will affected by the magnetic powder layer and thus be distributed evenly for heating the insert of the mold evenly. Moreover, as the heat insulating layer is capable of functioning to concentrate heat for preventing the heat from being conducted to its die base, the heating efficiency is improved. In addition, as the cooling plate and the coil are respectively configured with the second and the first fluid channels for the fluid to flow therein to be used for cooling down the insert and the coil, the overall cooling efficiency is improved.

Moreover, to achieve the above objects, the present invention further provides a mold heating/cooling structure for a mold configured with a die base and an insert, being disposed at a position between the die base and the insert while the die base is formed with a die impression for receiving the insert therein and the insert is formed with a cavity, the mold heating/cooling structure comprising: a heat insulating layer, disposed surrounding the periphery of the die impression as well as the bottom thereof for insulating the heat conduction between the die base and the insert; a magnetic powder layer, disposed against the heat insulating layer; a cooling layer, being disposed against the magnetic powder layer while enabling the same to contact directly with the insert, and being configured with a cooling space provide for a fluid to flow therein as the cooling space is a space enclosed and defined by the magnetic powder layer and the insert; and a coil, formed with a current-input port and a current-output port, being disposed on the magnetic powder layer in a manner that it is circling from the outside in toward the center of the magnetic powder layer.

In an exemplary embodiment of the invention, the mold heating/cooling structure for a mold further comprises: a supporting column, sandwiched between the insert and the heat insulating layer at a position relating to the center of the coil and being made of a material the same as that of the insert.

In another exemplary embodiment of the invention, the coil is a hollow copper tube wrapped by an insulating material that is configured with a first fluid channel provided for the fluid to flow therein.

In another exemplary embodiment of the invention, the coil is disposed at a position between the heat insulating layer and the magnetic powder layer.

In another exemplary embodiment of the invention, the coil is disposed inside the cooling space above the magnetic powder layer.

With the structures illustrated in the aforesaid embodiments, when a current is loaded to the coil for causing a magnetic field to be generated, the generated magnetic field will affected by the magnetic powder layer and thus be distributed evenly for heating the insert of the mold evenly. Moreover, as the heat insulating layer is capable of functioning to concentrate heat for preventing the heat from being conducted to its die base, the heating efficiency is improved. In addition, as the cooling layer is designed to contact directly with the insert for enabling the fluid flowing therein to be used for cooling down the insert and as and the fluid is also being fed into the coil through the first fluid channels, the overall cooling efficiency is improved.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 8B is a schematic diagram showing how magnetic field is distributed after configuring the mold heating/cooling structure of the invention with a magnetic powder layer.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
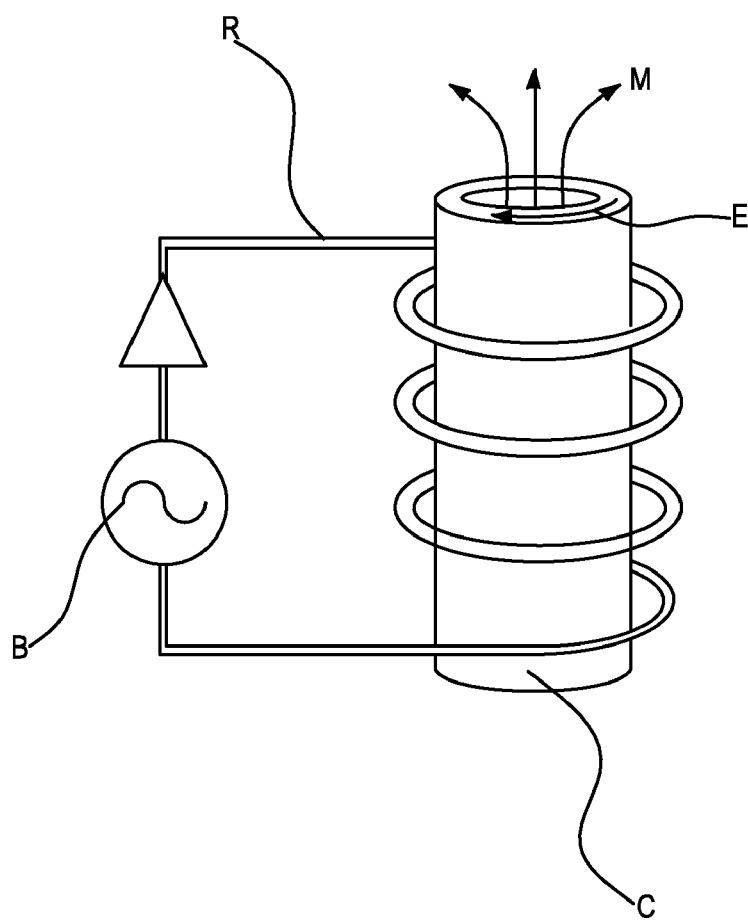
FIG. 1 is a schematic diagram for electromagnetic induction heating.

Please refer to FIG. 1, which is a schematic diagram for electromagnetic induction heating. In FIG. 1, a coil R is arranged circling a conductor C and connected to a power source S. For the given coil R, the electromagnetically induced electromotive force (EMF) on the conductor C is determined purely by the rate of change of the magnetic flux through the coil R according to Faraday's law of induction. As the coil R and the conductor C is under the influence of an external time-varying magnetic field M, an EMF is induced whenever there is change in the flux linkages that the changes can be brought about by moving the conductor C in the magnetic field M to procure a change in the flux linkage, or/and by the change in the magnetic field M around the stationary conductor C. Thus, the EMF can be formulated quantitatively in the form:

$$e = -N\frac{d\phi}{dt} - v\phi\frac{dN}{dx}$$

wherein e is the electromotive force (EMF) in volts;
N is the number of turns of coil R;
$\phi$ is the magnetic flux in webers;
v is the moving velocity of the conductor C in meter per second (m/s).

An eddy current E, being a swirling current set up in the conductor C in response to the EMF, will generate a power as it is swirling in the conductor C. According to the Joule rule, the power can be formulated quantitatively in the form:

$$P_v = \rho \cdot J^2$$

wherein $P_v$ is the volumetric power density in W/m$^3$;
$\rho$ is the resistivity in $\Omega$m;
J is the current density in A/m$^2$.

Due to the non-contact electromagnetic induction between the coil R and the conductor C that is caused when the conductor C is exposed to a changing magnetic field M, or when the magnetic field M is varying with time, the workpieces that are surrounded by the coil will be heated by the hysteresis loss. It is noted that the larger an area is located inside a hysteresis loop, the larger the coercive force Hc and remanence Br will be and thus the larger the hysteresis loss is going to be caused. Experimentally, the hysteresis loss can be formulated quantitatively in the form:

$$P_h = K_h \cdot f \cdot B_m^x \cdot U$$

wherein $P_h$ is the hysteresis loss of a workpiece;
$K_h$ is hysteresis coefficient;
f is the frequency in Hz;
$B_m$ is maximum magnetic flux density in tesla (T);

x is the material coefficient; and

U is the volume of the workpiece in m³.

As the power source is enabled to provide alternating currents of different frequencies to the coil R, there will be eddy currents E swirling in the workpiece in response to the EMF of the electromagnetic induction while there can be different eddy currents swirling on different layers of the workpiece and they may not be flowing evenly. By the electric resistance of the workpiece, the workpieces that are surrounded by the coil will be heated by the eddy current loss. The eddy current loss can be formulated quantitatively in the form:

$$P_e = K_e (B_{max} \cdot f \cdot t)^2;$$

wherein $P_e$ is the eddy current loss per unit weight in W/kg;

$K_e$ is a constant of proportionality relating to eddy current loss;

$B_{max}$ is maximum magnetic flux density in tesla (T);

f is the frequency in Hz;

t is the thickness of the workpiece in meter (m).

Figure 2:
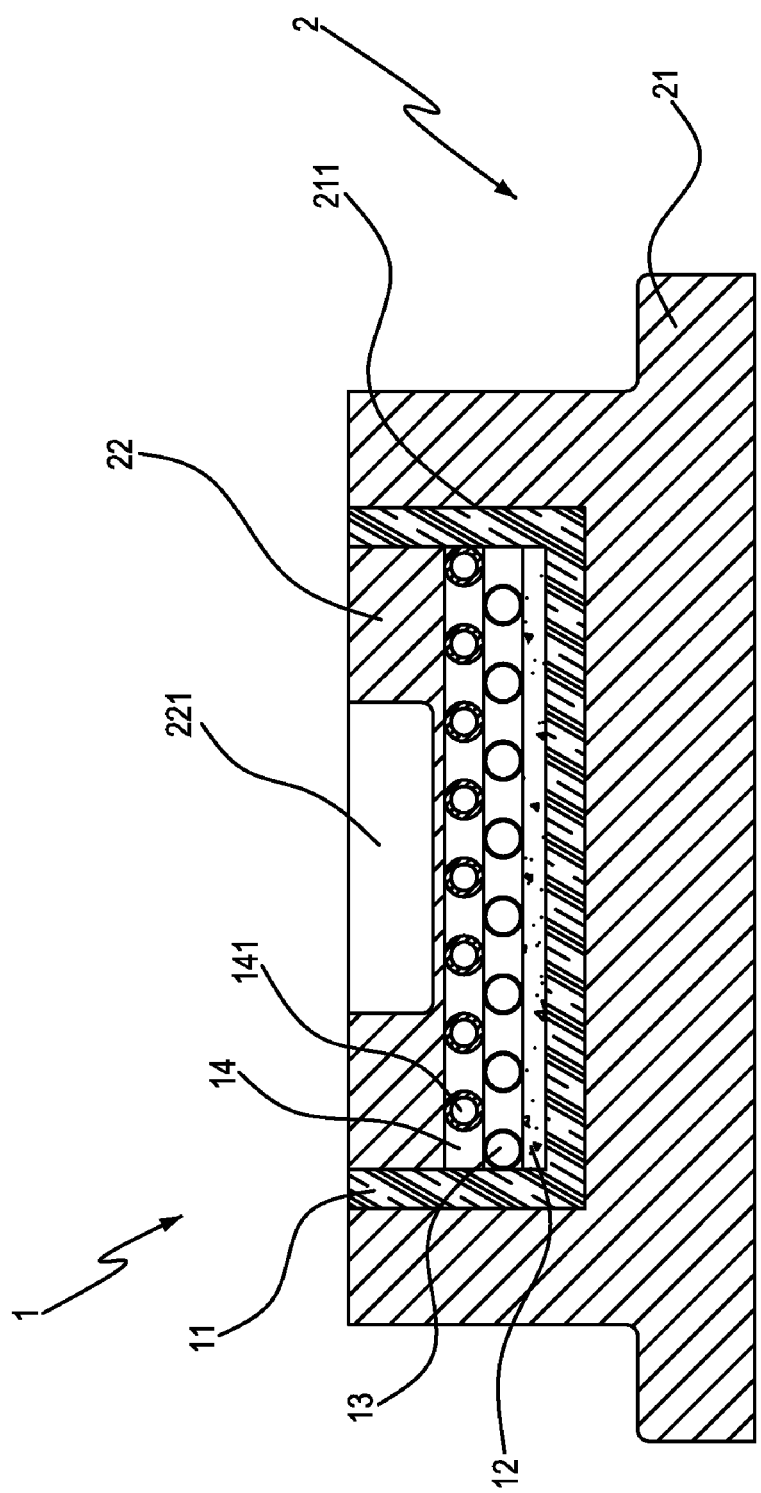
FIG. 2 is a sectional view of a mold heating/cooling structure according to a first embodiment of the invention.

Please refer to FIG. 2, which is a sectional view of a mold heating/cooling structure according to a first embodiment of the invention. The mold 2 in this embodiment is composed of a die base 21 and an insert 22, in which the die base 21 is formed with a die impression 211 for receiving the insert 22 therein and the insert 22 is formed with a cavity 221. Moreover, the mold heating/cooling structure 1 of the invention is disposed at a position between the die base 21 and the insert 22, which is comprised of: a heat insulating layer 11; a magnetic powder layer 12; a coil 13; and a cooling plate 14. As shown in FIG. 1, the heat insulating layer 11 is disposed in the die impression 211 of the die base 21 in a manner that it is substantially disposed surrounding the periphery of the die impression 211 as well as the bottom thereof for insulating the heat conduction between the die base 21 and the insert 22 for concentrating the heat on the insert 22. It is noted that the heat insulating layer 11 can be made of any common high strength fiber composite material with good heat insulation performance.

Figure 3:
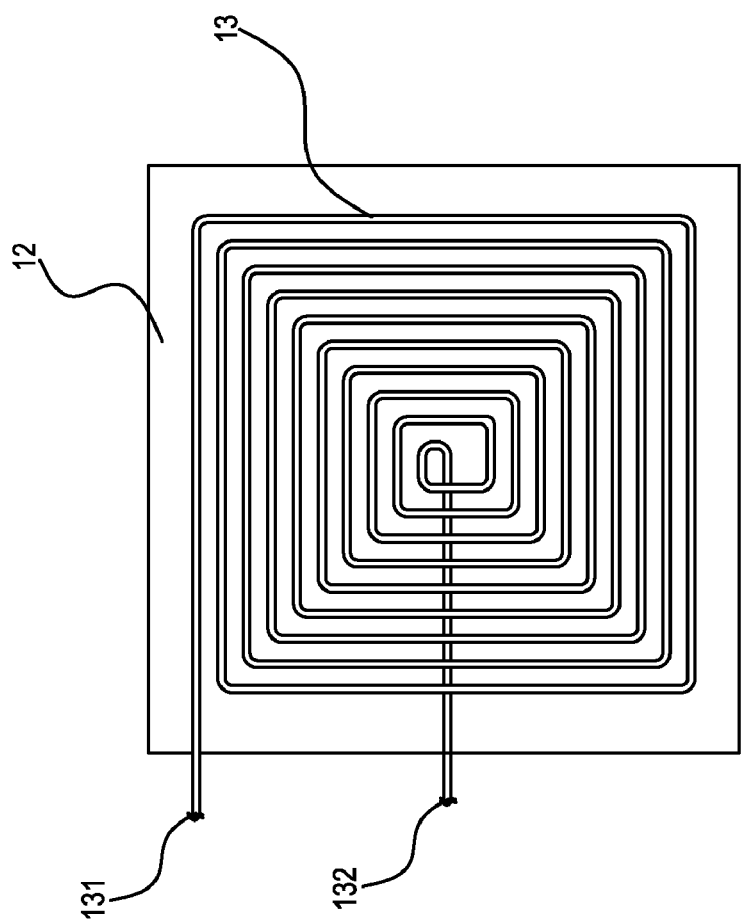
FIG. 3 is a top view showing a coil of the mold heating/cooling structure of the first embodiment being disposed on the magnetic powder layer.

Please refer to FIG. 3, which is a top view showing a coil of the mold heating/cooling structure of the first embodiment being disposed on the magnetic powder layer as depicted in FIG. 2. The magnetic powder layer 12, as shown in FIG. 2, is disposed right against the heat insulating layer 11 that it and is also substantially being placed on the heat insulating layer 11; and the coil 13, being formed with a current-input port 131 and a current-output port 132, is disposed on the magnetic powder layer 12 in a manner that it is circling from the outside in toward the center of the magnetic powder layer 12. In this embodiment, the coil 13 is sandwiched between the magnetic powder layer 12 and the heat insulating layer 11 cooling plate 14, but is not limited thereby. In another embodiment, the coil 13 can be sandwiched between the magnetic powder layer 12 and the cooling plate 14 heat insulating layer 11.

Figure 7:
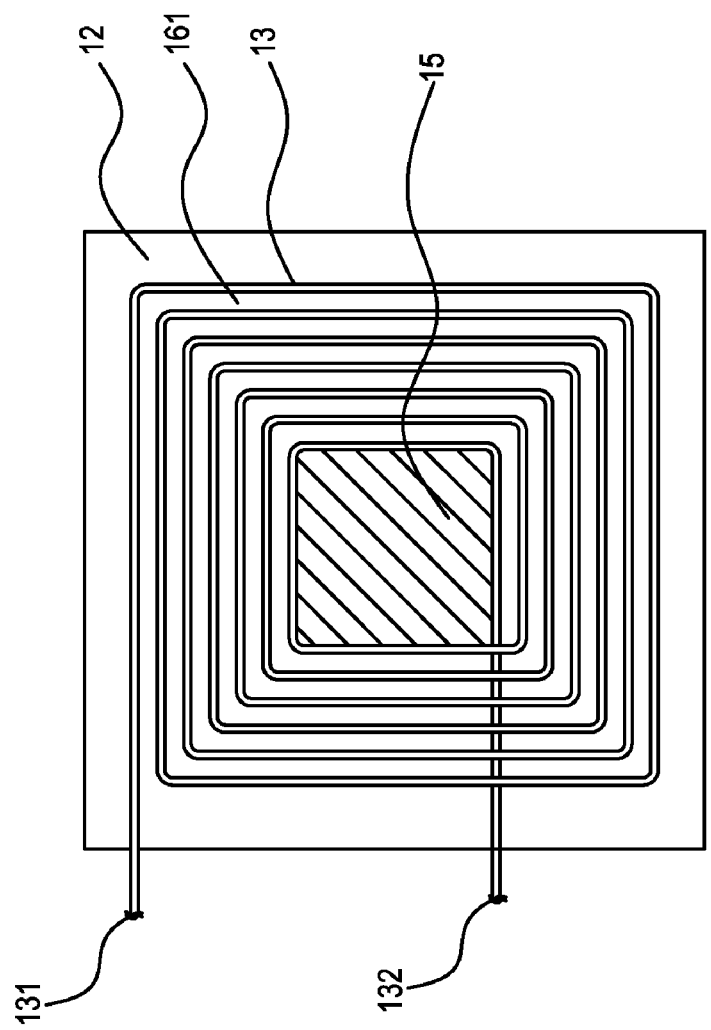
FIG. 7 is a top view showing the coil of the second embodiment being disposed on the magnetic powder layer.
Figure 8A:
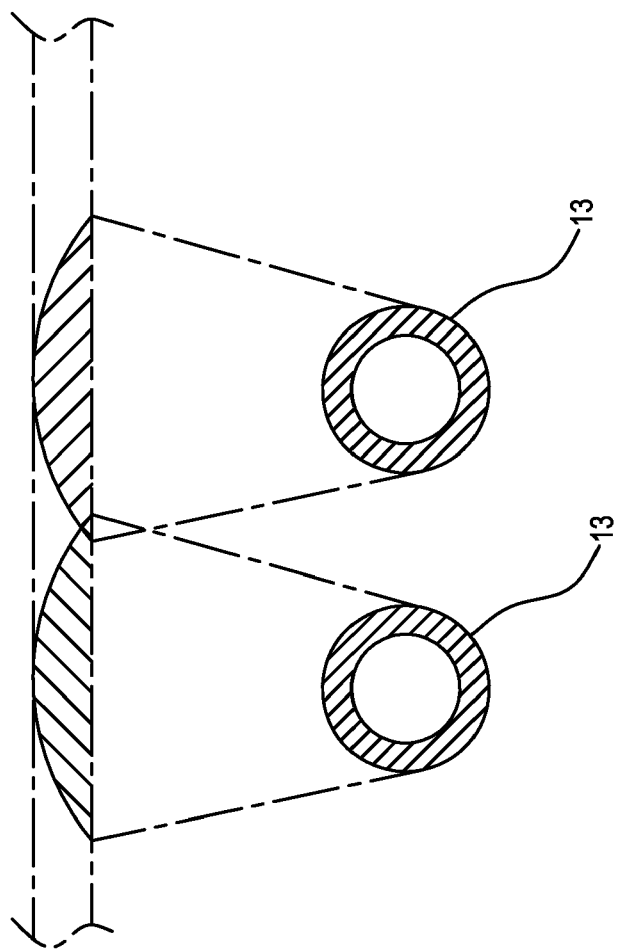
FIG. 8A is a schematic diagram showing how magnetic field is distributed before configuring the mold heating/cooling structure of the invention with a magnetic powder layer.

Please refer to FIG. 8A and FIG. 8B, which are the sectional views for the coil as depicted in the FIG. 7, showing how magnetic field is distributed before and after configuring the mold heating/cooling structure of the invention with a magnetic powder layer. When the coil 13 is loaded with a current as it is connected to an external power source by a conducting wire connected to its current-input port 131 and a current-output port 132. The density of the resulting magnetic field will not be distributed effectively as it is affected by the gaps between turns of the coil 13. As shown in FIG. 8B, if there is a magnetic powder layer 12 in the structure, the magnetic powder layer 12 will cause the magnetic field to distribute more effectively, and consequently it will affect the hysteresis loss and eddy current loss of the insert 22, which provides that the insert 22 will be heated evenly.

As shown in FIG. 2, for cooling down the heated insert 22 rapidly, the cooling plate 14 is disposed right against the magnetic powder layer 12 in a manner that it is substantially being placed on the magnetic powder layer 12 while enabling the cooling pate 14 to contact directly with the insert 22. It is noted that since the insert 22 is heated by the effect of hysteresis loss and eddy current loss caused from the current in the coil 13 in a non-contact manner, its heating performance will not be affected adversely by the sandwiching of the cooling plate 14 between the insert 22 and the coil 13. In addition, as the cooling plate 14 is being disposed to contact directly with the insert is configured with a plurality of second fluid channels 141 for a fluid or gas to flow therein, the insert 22 is able to be cooled down in a rapid manner.

Figure 4:
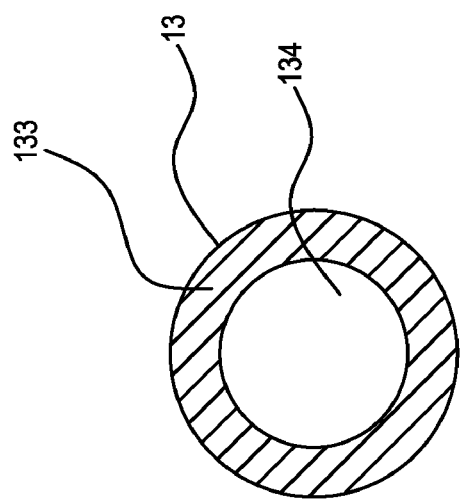
FIG. 4 is an enlarged view of the coil used in the mold heating/cooling structure of the first embodiment.

Please refer to FIG. 4, which is an enlarged view of the coil 13 used in the mold heating/cooling structure of the first embodiment as depicted in FIG. 2 and FIG. 3. For improving cooling efficiency, the coil 13 can be formed from a hollow copper tube 133 wrapped by an insulating material while being configured with a first fluid channel 134 provided for the fluid to flow therein. As the conducted coil 13 can be heated up by its own electric resistance, it is intended to use the fluid flowing in the first fluid channel 134 of the hollow coil 13 to cool down the heated coil 13. Thus, as the cooling plate 14 configured with the fluid channel 141, and the coil 13 configured with the fluid channel 134 for the fluid to flow therein, the efficiency for cooling down the insert 22 and the coil 13 are improved.

With the structures illustrated in the aforesaid embodiments, when a current is loaded to the coil 13 for causing a magnetic field to be generated, the generated magnetic field will affected by the magnetic powder layer 12 and thus be distributed evenly for heating the insert 22 of the mold evenly. Moreover, as the heat insulating layer 11 is capable of functioning to concentrate heat for preventing the heat from being conducted to its die base 21, the efficiency for heating up the insert 22 is improved. In addition, as the cooling plate 14 and the coil 13 are respectively configured with the second and the first fluid channels 141, 134 for the fluid to flow therein to be used for cooling down the insert 22 and the coil 13, the overall cooling efficiency is improved. In addition, as the line diameter of the coil 13 is about 6 mm and the thickness of the magnetic powder layer 12 is about 5 mm, the total thickness of the whole structure will not exceed 20 mm even in addition to the thicknesses of the heat insulating layer 11 and the cooling plate 14. Thus, for heat conduction and cooling effect, the thin mold heating/cooling structure of the invention can perform very well.

Figure 5:
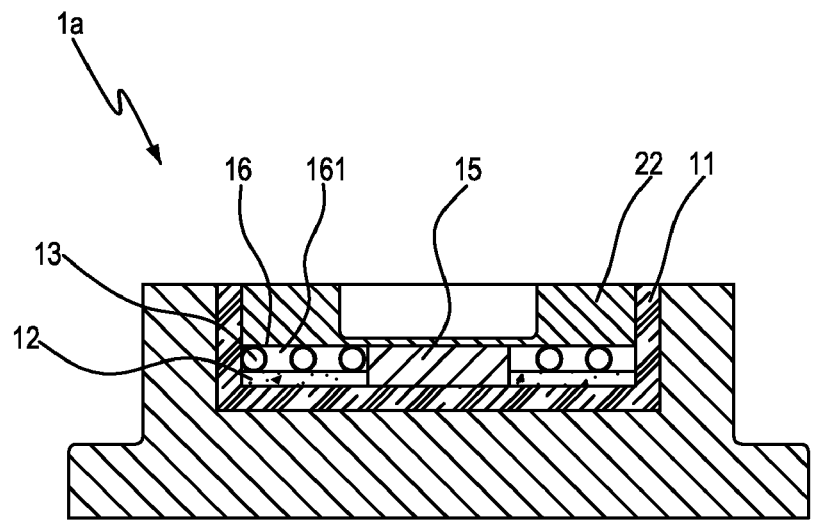
FIG. 5 is a sectional view of a mold heating/cooling structure according to a second embodiment of the invention.

Please refer to FIG. 5, which is a sectional view of a mold heating/cooling structure according to a second embodiment of the invention. As an injection molding process can be used for producing a large-sized product one at a time, or for producing multiple small-sized products in a mold simultaneously. Accordingly, there can be a large insert fitted inside the mold. However, since a large insert in a mold may be deforming by its own weight that consequently will cause the injected product to deform as well, the mold heating/cooling structure in this embodiment is further comprises a supporting column 15 for supporting the insert 22 and thus preventing the insert 22 from deforming by their own weights. The supporting column 15 is sandwiched between the insert 22 and the heat insulating layer 11.

In the embodiment shown in FIG. 5, the mold heating/cooling structure 1a includes a heat insulating layer 11, a magnetic powder layer 12, a coil 13, a cooling layer 16, and a cooling space 161, in which the heat insulating layer 11, the magnetic powder layer 12 and the coil 13 are structured and functioned similar to the first embodiment and thus are not described further herein; and the cooling layer 16, although can be structured similar to the cooling plate 14 of the first embodiment, is structured differently and described hereinafter.

Please refer to FIG. 7, which is a top view showing the coil of the second embodiment, as depicted in FIG. 5, being disposed on the magnetic powder layer. In FIG. 7, the cooling layer 16, being sandwiched between the insert 22 and the magnetic powder layer 12 as shown in FIG. 5, is configured with a cooling space 161 provide for a fluid to flow therein as the cooling space 161 is a space enclosed and defined by the magnetic powder layer 12 and the insert 22. The coil 13, being formed with a current-input port 131 and a current-output port 132, is disposed on the magnetic powder layer 12 in a manner that it is from the outside in toward the center of the magnetic powder layer 12. Accordingly, the coil 13 can either be disposed inside the cooling space 161 above the magnetic powder layer 12, or can be sandwiched between the heat insulating layer 11 and the magnetic powder layer 12. In this embodiment, the coil 13 is disposed inside the cooling space 161 above the magnetic powder layer 12. Moreover, the coil 13 can be disposed encircling the periphery of the supporting column 15. Since the supporting column 15 and the insert 22 are made of the same material, the insert 22 and the supporting column 15 can be heated at the same time as soon as the coil 13 is loaded with the current. Furthermore, since the supporting column 15 is arranged to contact with the insert 22 directly, the heat of the supporting column can be transferred to the insert 22 so that the efficiency for heating the insert 22 is enhanced.

Figure 6:
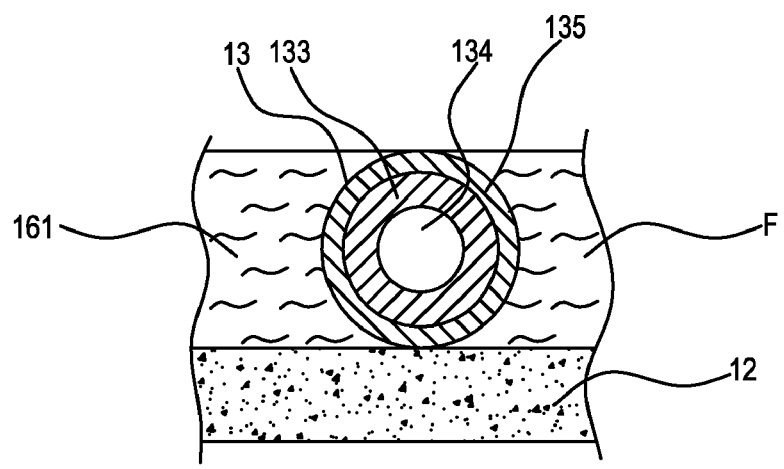
FIG. 6 is a sectional view showing a coil of the mold heating/cooling structure of the second embodiment being disposed inside the cooling space while being placed on the magnetic powder layer.

Please refer to FIG. 6, which is a sectional view showing a coil of the mold heating/cooling structure of the second embodiment, as depicted in FIG. 5, being disposed inside the cooling space while being placed on the magnetic powder layer. In FIG. 6, the coil 13 is formed from a hollow copper tube 133 wrapped by an insulating material 135 while being configured with a first fluid channel 134 provided for the fluid F to flow therein. For cooling the heated insert 22, the fluid F is fed into the cooling space 161 of the cooling layer 16 so that the heat of the insert 22 as well as the heat of the supporting column 15 can dissipated by the flowing fluid since the cooling layer 16 is designed to contact directly with the insert 22 and the supporting column 15. Moreover, as the conducted coil 13 can be heated up by its own electric resistance, it is intended to use the fluid flowing in the first fluid channel 134 of the hollow coil 13 to cool down the heated coil 13. Thus, as the coil 13 is configured with the first fluid channels 134 for the fluid to flow therein, the efficiency for cooling down the coil 13 are improved.

Figure 9:
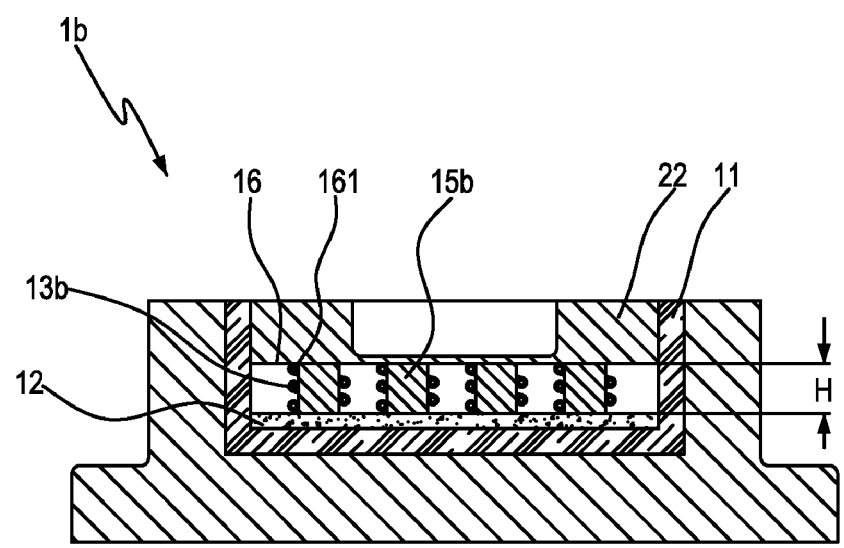
FIG. 9 is a sectional view of a mold heating/cooling structure according to a third embodiment of the invention.

Please refer to FIG. 9, which is a sectional view of a mold heating/cooling structure according to a third embodiment of the invention. The mold heating/cooling structure shown in this embodiment is similar to that shown in the previous two embodiments, but is adapted for those molds with large-sized inserts. Since a large insert in a mold may be deforming by its own weight that consequently will cause the injected product to deform as well, the mold heating/cooling structure in this embodiment is further comprises a plurality of supporting columns 15b for supporting the insert 22 and thus preventing the same from deforming by their own weights. The plural supporting columns 15b are sandwiched between the insert 22 and the heat insulating layer 11.

In this third embodiment, the mold heating/cooling structure 1b includes a heat insulating layer 11, a magnetic powder layer 12, a coil 13b and a cooling layer 16, in which the heat insulating layer 11 and the magnetic powder layer 12 are structured and functioned similar to the previous two embodiments and thus are not described further herein; and the cooling layer 16 is structured similar to the cooling plate 14 of the first embodiment.

Except for the amount of supporting columns, the difference between the third embodiment and the second embodiment is that: by the specific height H of each supporting column 15b, the coil 13b of the third embodiment is disposed encircling the periphery of each supporting column 15b as the plural turns of the coil are related to the plural supporting columns 15b while being connected with each other. Thereby, each and every supporting column 15b can be heated respectively, and as there are multiple supporting columns 15b being formed in a manner that they are either in contact with the insert 22 directly, or are integrally formed with the insert 22, the efficiency for heating or cooling the insert 22 can be greatly enhanced.

From the above description, it is noted that the heating/cooling distance measured between the insert 22 and the coil 13 is shortened by the arrangement of receiving the coil 13 inside the cooling space 161 of the cooling layer 16. Moreover, by the arrangement of the plural supporting columns 15, the insert 22 can be prevented from deforming by its own weight and consequent the yield of the injection molding process can be improved. In addition, since the supporting columns 15 is made of a material the same as that of the insert 22 while they are arranged to contact directly with the insert 22, the efficiency for heating or cooling the insert 22 can be greatly enhanced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A mold heating/cooling structure for a mold configured with a die base and an insert, being disposed at a position between the die base and the insert while the die base is formed with a die impression for receiving the insert therein and the insert is formed with a cavity, the mold heating/cooling structure comprising:
   a heat insulating layer, disposed surrounding the periphery of the die impression as well as the bottom thereof for insulating the heat conduction between the die base and the insert;
   a magnetic powder layer, disposed against the heat insulating layer;
   a coil, formed with a current-input port and a current-output port, being disposed on the magnetic powder layer in a manner that it is circling from the outside in toward the center of the magnetic powder layer; and
   a cooling plate, configured with a plurality of second fluid channels provided for a fluid to flow therein, being disposed against the coil while enabling the cooling plate to contact directly with the insert.

2. The mold heating/cooling structure of claim 1, wherein the coil is a hollow copper tube wrapped by an insulating material while being configured with a first fluid channel provided for the fluid to flow therein.

3. The mold heating/cooling structure of claim 1, wherein the fluid is a matter selected from the group consisting of: gas and liquid.

4. The mold heating/cooling structure of claim 2, wherein the fluid is a matter selected from the group consisting of: gas and liquid.

5. The mold heating/cooling structure of claim 1, further comprising:
   a supporting column, sandwiched between the insert and the heat insulating layer at a position relating to the center of the coil and being made of a material the same as that of the insert.

6. The mold heating/cooling structure of claim 1, wherein the coil is disposed at a position between the magnetic powder layer and the cooling plate.

7. The mold heating/cooling structure of claim 1, wherein when a current is loaded to the coil for causing a magnetic field to be generated, the generated magnetic field will affected by the magnetic powder layer and thus be distributed evenly for heating the insert of the mold evenly; and as the heat insulating layer is used to concentrate heat for preventing the heat from being conducted to the die base, the efficiency for heating the insert is increased; and also as the cooling plate being disposed to contact directly with the insert is configured with the second fluid channels for the fluid to flow therein, the insert is able to be cooled down in a rapid manner.

8. The mold heating/cooling structure of claim 2, wherein when a current is loaded to the coil for causing a magnetic field to be generated, the generated magnetic field will affected by the magnetic powder layer and thus be distributed evenly for heating the insert of the mold evenly; and as the heat insulating layer is used to concentrate heat for preventing the heat from being conducted to the die base, the efficiency for heating the insert is increased; and also as the cooling plate and the coil are respectively configured with the second and the first fluid channels for the fluid to flow therein, the insert and the coil are able to be cooled down with high efficiency.

9. A mold heating/cooling structure for a mold configured with a die base and an insert, being disposed at a position between the die base and the insert while the die base is formed with a die impression for receiving the insert therein and the insert is formed with a cavity, the mold heating/cooling structure comprising:
   a heat insulating layer, disposed surrounding the periphery of the die impression as well as the bottom thereof for insulating the heat conduction between the die base and the insert;
   a magnetic powder layer, disposed against the heat insulating layer;
   a cooling layer, being disposed against the magnetic powder layer while enabling the cooling layer to contact directly with the insert, and being configured with a cooling space provide for a fluid to flow therein as the cooling space is a space enclosed and defined by the magnetic powder layer and the insert; and
   a coil, formed with a current-input port and a current-output port, being disposed on the magnetic powder layer in a manner that it is circling from the outside in toward the center of the magnetic powder layer.

10. The mold heating/cooling structure of claim 9, wherein the coil is a hollow copper tube wrapped by an insulating material while being configured with a first fluid channel provided for the fluid to flow therein.

11. The mold heating/cooling structure of claim 9, wherein the fluid is a matter selected from the group consisting of: gas and liquid.

12. The mold heating/cooling structure of claim 10, wherein the fluid is a matter selected from the group consisting of: gas and liquid.

13. The mold heating/cooling structure of claim 9, wherein the coil is disposed inside the cooling space above the magnetic powder layer.

14. The mold heating/cooling structure of claim 9, further comprising:
   a supporting column, sandwiched between the insert and the heat insulating layer at a position relating to the center of the coil and being made of a material the same as that of the insert.

15. The mold heating/cooling structure of claim 9, wherein when a current is loaded to the coil for causing a magnetic field to be generated, the generated magnetic field will affected by the magnetic powder layer and thus be distributed evenly for heating the insert of the mold evenly; and as the heat insulating layer is used to concentrate heat for preventing the heat from being conducted to its die base, the efficiency for heating the insert is increased; and as the cooling layer is designed to contact directly with the insert for enabling the fluid flowing therein to be used for cooling down the insert, the insert is able to be cooled down in a rapid manner.

16. The mold heating/cooling structure of claim 10, wherein when a current is loaded to the coil for causing a magnetic field to be generated, the generated magnetic field will affected by the magnetic powder layer and thus be distributed evenly for heating the insert of the mold evenly; and as the heat insulating layer is used to concentrate heat for preventing the heat from being conducted to its die base, the efficiency for heating the insert is increased; and as the cooling layer is designed to contact directly with the insert for enabling the fluid flowing therein to be used for cooling down the insert and as and the fluid is also being fed into the coil through the first fluid channels, the insert and the coil are able to be cooled down with high efficiency.

17. A mold heating/cooling structure for a mold configured with a die base and an insert, being disposed at a position between the die base and the insert while the die base is formed with a die impression for receiving the insert therein and the insert is formed with a cavity, the mold heating/cooling structure comprising:
   a heat insulating layer, disposed surrounding the periphery of the die impression as well as the bottom thereof for insulating the heat conduction between the die base and the insert;
   a magnetic powder layer, disposed against the heat insulating layer;
   a cooling layer, being disposed against the magnetic powder layer while enabling the cooling layer to contact directly with the insert, and being configured with a cooling space provide for a fluid to flow therein as the cooling space is a space enclosed and defined by the magnetic powder layer and the insert;
   a plurality of supporting columns, evenly distributed between the insert and the heat insulating layer and being made of a material the same as that of the insert; and
   a coil, disposed encircling the periphery of each supporting column as the plural turns of the coil are related to the plural supporting columns while being connected with each other.

* * * * *